United States Patent Office 2,800,477
Patented July 23, 1957

2,800,477

QUATERNARY AMMONIUM HALIDES OF ESTER-LIKE 6-ALKOXY-TROPINE DERIVATIVES

Arthur Stoll, Arlesheim, Ernst Jucker, Binningen, and Adolf Lindenmann, Basel, Switzerland, assignors to Saul & Co., Newark, N. J., as nominee of Fidelity Union Trust Company No Drawing. Application January 17, 1955, Serial No. 482,435

Claims priority, application Switzerland January 22, 1954

6 Claims. (Cl. 260—292)

The present invention relates to new quaternary ammonium halides of ester-like derivatives of tropine.

The said new halides, which are valuable because of their pharmacodynamic properties, correspond to the formula

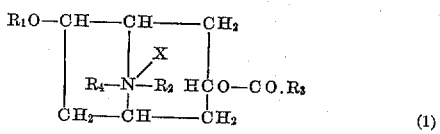

wherein $R_1$ may be ethyl, methyl or propyl, $R_2$ may be ethyl, methyl, propyl, butyl or benzyl, and $R_3$ may be one of the following radicals:

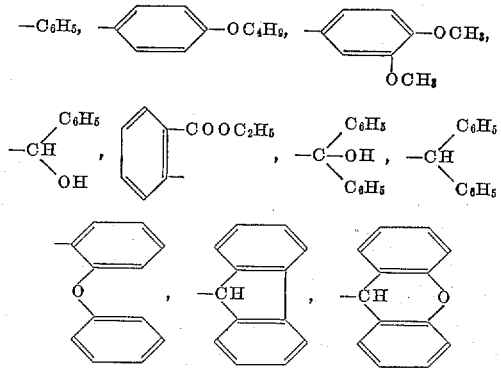

$R_4$ may be methyl, ethyl or butyl, and X may be Cl, Br or I.

The aforesaid quaternary ammonium halides of Formula 1 can be prepared, according to this invention, by reacting the corresponding compounds of the formula

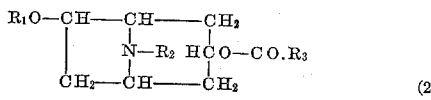

wherein $R_1$, $R_2$ and $R_3$ have the precedingly-recited significances, with the corresponding alkyl halides.

The ester-like 6-alkoxy-tropine derivatives of Formula 2 can be prepared as described in copending application, Serial No. 482,434, filed on even date herewith and in the corresponding Swiss patent applications acknowledged in said application. Briefly stated, the compounds of Formula 2 can be prepared by reducing—e. g. by catalytic hydrogenation, or by means of sodium in an alcohol, or by treatment with lithium-aluminum-hydride—to the secondary alcohol group the keto group in the corresponding tropinone derivatives of the formula

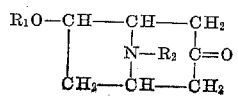

wherein $R_1$ and $R_2$ have the precedingly-recited significances, and then esterifying the so-obtained tropan-3-ol derivatives with acids corresponding to the formula $R_3.COOH$, $R_3$ having the aforesaid significance. If desired, alcoholysis with an ester of the formula $R_3.COO$-alkyl may be carried out in this regard, or the desired esters may be obtained with the aid of the corresponding acid chloride of the formula $R_3.COCl$.

The tropinone compounds of Formula 3 can be prepared by condensing an O-alkyl-malic dialdehyde with acetone dicarboxylic acid and a primary amine, after the manner of the following reaction scheme ($R_1$ and $R_2$ having the aforesaid significances):

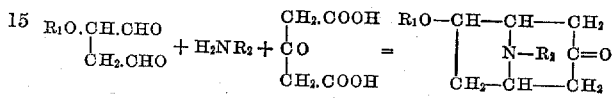

See also Helv. Chim. Acta 37, 495 and 649 (1954) and copending application Ser. No. 438,334, filed June 21, 1954, and the corresponding acknowledged Swiss patent applications.

The tropine derivatives of Formula 2 are basic substances, which form salts with acids. Reaction thereof with organic halogen compounds, according to the present invention, yields products containing a quaternary nitrogen atom, which products have extraordinary pharmacodynamic activity and, in this connection, are fundamentally distinguished from the esters used as starting materials. The quaternization takes places very readily, in many cases in the cold, and the quaternary salts are obtained in good yield.

In preparing the new compounds of the present invention, the preferred procedure in practice is to heat the ester-like 6-alkoxy-tropine derivative with the organic halide. In many cases, the quaternary compound is produced when the ester-like 6-alkoxy-tropine derivative and the organic halogen compound are dissolved in a solvent, such as acetone or an aliphatic alcohol, and allowed to stand in closed container at room temperature (about 20–30° C.) or even in the cold.

The formed quaternary compounds are worked up, as will appear from the illustrative examples which follow, and are purified by recrystallization.

The compounds obtained according to this invention are well crystallizing substances. They are distinguished by a surprisingly strong curare-like activity and also by a ganglionic blocking action; they are therefore useful in therapy as substitutes for curare, as spasmolytica and as neuroplegica.

The following examples set forth presently-preferred representative embodiments of the invention. In these examples, parts by weight bear the same relationship to parts by volume as do grams to milliliters. The temperatures are in degrees centigrade.

Example 1

The solution of 1 part by weight of 6-methoxy-tropine-fluorene-9-carboxylic acid ester in 5 parts by volume of methyl bromide and 3 parts by volume of acetone is allowed to stand in a closed receptacle at room temperature (about 20–30°) for 48 hours. The mixture is then concentrated under reduced pressure and the obtained oily residue is caused to harden in the form of crystals, by trituration with acetone. The product—6-methoxy-tropine-fluorene-9-carboxylic acid ester bromomethylate—melts at 135° (with decomposition).

The 6-methoxy-tropine-fluorene-9-carboxylic acid ester, used as starting material in the present example, may be prepared as follows:

A mixture of 3 parts of weight of 6-methoxy-tropine and 8.3 parts by weight of fluorene-9-carboxylic acid-ethylester is heated with a small quantity of metallic sodium to 130° under reduced pressure for 30 hours. The reaction mixture is taken up in 2-normal hydrochloric acid, and then extracted with ether. The aqueous hydrochloric acid layer is extracted with chloroform, and the chloroform extract is then evaporated under reduced pressure. The 6-methoxy-tropine-fluorene-9-carboxylic acid ester hydrochloride is caused to crystallize out by the addition of ether. The free ester base is then recovered from the hydrochloride.

*Example 2*

The solution of 0.7 part by weight of 6-methoxy-tropine-xanthene-9-carboxylic acid ester in 5 parts by volume of methyl bromide and 3 parts by volume of methanol is heated to 70° in a bomb tube for 3 hours. The mixture is then concentrated under reduced pressure, the residue taken up in methanol, and the produced 6-methoxy-tropine-xanthene-9-carboxylic acid ester bromomethylate is caused to crystallize out by the careful addition of ether. The so-obtained bromomethylate crystallizes out of methanol-ether in the form of needles which melt at 247–250° (with decomposition).

The 6-methoxy-tropine-xanthene-9-carboxylic acid ester, used as starting material in the present example, may be prepared as follows:

A mixture of 3 parts by weight of 6-methoxy-tropine and 8.4 parts by weight of xanthene-9-carboxylic-acid-methylester is heated to 130° with a small quantity of metallic sodium for 30 hours under reduced pressure. The reaction mixture is taken up in hydrochloric acid, and is then extracted with ether. The aqueous hydrochloric acid layer is shaken out with chloroform, and the chloroform extract is then evaporated. 6-methoxy-tropine-xanthene-9-carboxylic acid ester is obtained directly from the hydrochloride residue.

*Example 3*

The solution of 1 part by weight of 6-methoxy-pseudo-tropine-benzilic acid ester in 8 parts by volume of methyl bromide and 3 parts by volume of acetone is heated to 60–70° in a bomb tube for a period of 3 hours. The mixture is concentrated under reduced pressure, the residue is taken up in methanol, and the produced 6-methoxy-pseudo-tropine-benzilic acid ester bromomethylate is caused to crystallize out by the careful addition of ether. The so-obtained bromomethylate crystallizes out of methanol-ether in the form of lamellae which melt at 247–248° (with decomposition).

The 6-methoxy-pseudo-tropine-benzilic acid ester, used as starting material in the present example, may be prepared as follows:

A mixture of 1.5 parts by weight of 6-methoxy-pseudo-tropine and 4.47 parts by weight of benzilic acid ethylester is heated to 110° for 30 hours under reduced pressure with a small quantity of metallic sodium. The reaction mixture is taken up in hydrochloric acid, and is then extracted with ether. The aqueous hydrochloric acid layer is shaken out with chloroform, and the chloroform extract is then evaporated. 6-methoxy-pseudo-tropine-benzilic acid ester hydrochloride is caused to crystallize out of the residue, in solution in acetone, by the addition of ether. The desired free ester base is obtained from the hydrochloride.

*Example 4*

The solution of 1 part by weight of 6-methoxy-pseudo-tropine-phenyl-cyclohexyl-acetic acid ester in 5 parts by volume of methyl bromide and 3 parts by volume of acetone is allowed to stand in a closed container at room temperature (about 20–30°) for 48 hours. The mixture is then concentrated under reduced pressure, the residue is taken up in a small quantity of methanol, and the produced 6-methoxy-pseudo-tropine-phenyl-cyclohexyl-acetic acid ester bromomethylate is caused to crystallize out by the careful addition of ether. The so-obtained bromomethylate crystallizes out of methanol-ether in the form of crystals which melt at 214–216° (with decomposition).

The 6-methoxy-pseudo-tropine-phenyl-cyclohexyl-acetic acid ester, used as starting material in the present example, may be prepared as follows:

A mixture of 3 parts by weight of 6-methoxy-pseudo-tropine and 9.12 parts by weight of phenyl-cyclohexyl-acetic acid-ethylester is heated with metallic sodium to 130° under reduced pressure for 30 hours. The reaction mixture is taken up in hydrochloric acid, and is then extracted with ether. The aqueous hydrochloric acid layer is shaken out with chloroform, and the chloroform extract is then evaporated. 6-methoxy-pseudo-tropine-phenyl-cyclohexyl-acetic acid ester hydrochloride is caused to crystallize out of a solution of the residue in acetone by the addition of ether. The desired free ester base is obtained from the hydrochloride.

*Example 5*

The solution of 1 part by weight of 6-methoxy-pseudo-tropine-α-phenyl-α-cyclohexyl-glycolic acid ester in 5 parts by volume of methyl bromide and 3 parts by volume of acetone is allowed to stand in a bomb tube at room temperature (about 20–30°) for 24 hours. The mixture is concentrated under reduced pressure, the residue is taken up in a small quantity of methanol, and the produced 6-methoxy-pseudo-tropine-α-phenyl-α-cyclohexyl-glycolic acid ester bromomethylate is caused to crystallize out by the careful addition of ether. The so-obtained bromomethylate crystallizes out of methanol-ether in the form of needles which melt at 255–257° (with decomposition).

The 6-methoxy-pseudo-tropine-α-phenyl-α-glycolic acid ester, used as starting material in the present example, may be prepared as follows:

A mixture of 1.28 parts by weight of 6-methoxy-pseudo-tropine and 3.9 parts by weight of α-phenyl-α-cyclohexyl-glycolic acid-ethylester is heated with a small quantity of metallic sodium to 110° under reduced pressure for 30 hours. The reaction mixture is taken up in hydrochloric acid, and is then extracted with ether. The aqueous hydrochloric acid layer is shaken out with chloroform, and the chloroform extract is then evaporated. 6-methoxy-pseudo-tropine-α-phenyl-α-cyclohexyl-glycolic acid ester hydrochloride is caused to crystallize out of a solution of the residue in acetone, by the addition of ether. The desired starting compound is obtained from the hydrochloride.

*Example 6*

The solution of 1 part by weight of 6-methoxy-pseudo-tropine-fluorene-9-carboxylic acid ester in 5 parts by volume of methyl bromide and 3 parts by volume of acetone is allowed to stand in a closed container at room temperature (about 20–30°) for 48 hours. The reaction mixture is triturated with acetone, whereupon 6-methoxy-pseudo-tropine-fluorene-9-carboxylic acid ester bromomethylate crystallizes out in the form of needle clusters which melt at about 80° (with decomposition).

The 6-methoxy-pseudo-tropine-fluorene-9-carboxylic acid ester, used as starting material in the present example, may be prepared as follows:

A mixture of 3 parts by weight of 6-methoxy-pseudo-tropine and 8.3 parts by weight of fluorene-9-carboxylic acid-ethylester is heated with a small quantity of metallic sodium to 130° under reduced pressure for 30 hours. The reaction mixture is taken up in hydrochloric acid, and is then extracted with ether. The aqueous hydrochloric acid layer is shaken out with chloroform, and the chloroform extract is then evaporated. 6-methoxy-pseudo-tropine-fluorene-9-carboxylic acid ester hydrochloride is caused to crystallize out of a solution of the residue in acetone, by the addition of ether. The desired starting material is obtained from the hydrochloride.

Example 7

The solution of 0.9 part by weight of 6-methoxy-pseudo-tropine-xanthene-9-carboxylic acid ester in 10 parts by volume of methyl bromide and 3 parts by volume of methanol is heated to 60–70° in a bomb tube for 2 hours. The mixture is then concentrated under reduced pressure, the residue is taken up in a small quantity of methanol, and the formed 6-methoxy-pseudo-tropine-xanthene-9-carboxylic acid ester bromomethylate is caused to crystallize out by the careful addition of ether. The so-obtained bromomethylate crystallizes out of methanol-ether in the form of clusters of needles which melt at 234–236° (with decomposition).

The 6-methoxy-pseudo-tropine-xanthene-9-carboxylic acid ester, used as starting material in the present example, may be prepared as follows:

A mixture of 3 parts by weight of 6-methoxy-pseudo-tropine and 8.4 parts by weight of xanthene-9-carboxylic acid-methylester is heated with a small quantity of sodium metal to 130° under reduced pressure for 30 hours. The reaction mixture is taken up in hydrochloric acid, and is then extracted with ether. The aqueous hydrochloric acid layer is shaken out with chloroform, and the chloroform extract is then evaporated. 6-methoxy-pseudo-tropine-xanthene-9-carboxylic acid ester hydrochloride is caused to crystallize out of a solution of the residue in methanol, by the addition of ether. The desired starting material is obtained from the hydrochloride.

Example 8

The solution of 1 part by weight of 6-methoxy-pseudo-tropine-o-phenoxy-benzoic acid ester in 5 parts by volume of methyl bromide and 3 parts by volume of acetone is allowed to stand in a closed container at room temperature (about 20–30°) for 48 hours. The mixture is then concentrated under reduced pressure, the residue is taken up in a small quantity of acetone, and the produced 6-methoxy-pseudo-tropine-o-phenoxy-benzoic acid ester bromomethylate is caused to crystallize out by the careful addition of ether. The so-obtained bromomethylate crystallizes out of acetone-ether in the form of clusters of needles which melt at 232–235° (with decomposition).

The 6-methoxy-pseudo-tropine-o-phenoxy-benzoic acid ester, used as starting material in the present example, may be prepared as follows:

A mixture of 3 parts by weight of 6-methoxy-pseudo-tropine and 8.5 parts by weight of o-phenoxy-benzoic acid-ethylester is heated with a small quantity of metallic sodium to 130° in vacuo for 30 hours. The reaction mixture is taken up in hydrochloric acid, and is then extracted with ether. The aqueous hydrochloric acid layer is shaken out with chloroform, and the chloroform extract is then evaporated. 6-methoxy-pseudo-tropine-o-phenoxy benzoic acid ester hydrochloride is caused to crystallize out of a solution of the residue in ethanol, by the addition of ether. The desired starting compound is obtained from the hydrochloride.

Example 9

The solution of 1 part by weight of 6-methoxy-pseudo-tropine-p-butoxy-benzoic acid ester in 5 parts by volume of methyl bromide and 3 parts by volume of acetone is allowed to stand in a closed receptacle at room temperature (about 20–30°) for 48 hours. The mixture is then concentrated under reduced pressure, the residue is taken up in a small quantity of acetone, and the produced 6-methoxy-pseudo-tropine-p-butoxy-benzoic acid ester bromomethylate is caused to crystallize out by the careful addition of ether. The so-obtained bromomethylate crystallizes out of acetone-ether in the form of clusters of needles which melt at 207–209° (with decomposition).

The 6-methoxy-pseudo-tropine-p-butoxy-benzoic acid ester, used as starting material in the present example, may be prepared as follows:

A mixture of 2 parts by weight of 6-methoxy-pseudo-tropine and 5.2 parts by weight of p-butoxy-benzoic acid-ethylester is heated with a small quantity of metallic sodium to 130° in vacuo for 30 hours. The reaction mixture is taken up in hydrochloric acid, and is then extracted with ether. The aqueous hydrochloric acid layer is shaken out with chloroform, and the chloroform extract is then evaporated. 6-methoxy-pseudo-tropine-p-butoxy-benzoic acid ester hydrochloride is caused to crystallize out of a solution of the residue in acetone, by the addition of ether. The desired starting compound is obtained from the hydrochloride.

Example 10

The solution of 1 part by weight of 6-ethoxy-tropine-fluorene-9-carboxylic acid ester in 8 parts by volume of methyl bromide and 3 parts by volume of acetone is allowed to stand in a closed container at room temperature (about 20–30°) for 24 hours. The precipitated crystal mass is then filtered off and washed with a small quantity of acetone. The so-produced 6-ethoxy-tropine-fluorene-9-carboxylic acid ester bromomethylate crystallizes in the form of needle clusters which melt at 233–236° (with decomposition).

The 6-ethoxy-tropine-fluorene-9-carboxylic acid ester, used as starting material in the present example, may be prepared after the manner set forth in the last paragraph of Example 1, using the 6-ethoxy-tropine in lieu of the 6-methoxy-tropine.

Example 11

The solution of 0.7 part by weight of 6-ethoxy-tropine-xanthene-9-carboxylic acid ester in 5 parts by volume of methyl bromide and 3 parts by volume of acetone is heated to 70° in a bomb tube for 3 hours. The mixture is then concentrated under reduced pressure, the residue is taken up in a small quantity of ethanol, and the formed 6-ethoxy-tropine-xanthene-9-carboxylic acid ester bromomethylate is caused to crystallize out by the careful addition of ether. The so-obtained bromomethylate crystallizes out of alcohol-ether in the form of clusters of needles which melt at 216–218° (with decomposition).

The 6-ethoxy-tropine-xanthene-9-carboxylic acid ester, used as starting material in the present example, may be prepared after the manner set forth in the last paragraph of Example 2, using the 6-ethoxy-tropine in lieu of the 6-methoxy-tropine.

Example 12

The solution of 1 part by weight of 6-ethoxy-tropine-o-phenoxy-benzoic acid ester in 5 parts by volume of methyl bromide and 3 parts by volume of acetone is allowed to stand at room temperature (about 20–30°) for 48 hours. The precipitated crystal mass is filtered off and is washed with a mixture of acetone and ether. The so-obtained 6-ethoxy-tropine-o-phenoxy-benzoic acid ester bromomethylate forms strongly hygroscopic platelets, which deliquesce in the air.

The 6-ethoxy-tropine-o-phenoxy-benzoic acid ester, used as starting material in the present example, may be prepared after the manner set forth in the last paragraph of Example 8, using the 6-ethoxy-tropine in lieu of the 6-methoxy-tropine.

Example 13

The solution of 1 part by weight of 6-ethoxy-tropine-p-butoxy-benzoic acid ester in 5 parts by volume of methyl bromide and 3 parts by volume of acetone is allowed to stand in a closed container at room temperature (about 20–30°) for 48 hours. The reaction mixture is then concentrated, the residue is taken up in a small quantity of acetone, and the formed 6-ethoxy-tropine-p-butoxy-benzoic acid ester bromomethylate is caused to crystallize out by the careful addition of ether. The so-obtained bromomethylate crystallizes out of acetone-ether in needle clusters which melt at 179–181° (with decomposition).

The 6-ethoxy-tropine-p-butoxy-benzoic acid ester, used as starting material in the present example, may be prepared as follows:

A mixture of 3 parts by weight of 6-ethoxy-tropine and 7.27 parts by weight of p-butoxy-benzoic acid-ethylester is heated with a small quantity of metallic sodium to 130° in vacuo for 30 hours. The reaction mixture is taken up in hydrochloric acid, and is then extracted with ether. The aqueous hydrochloric acid layer is shaken out with chloroform, and the chloroform extract is then evaporated. 6-ethoxy-tropine-p-butoxy-benzoic acid ester hydrochloride is caused to crystallize out of a solution of the residue in acetone, by the addition of ether. The desired starting material is obtained from the hydrochloride.

Example 14

The solution of 1 part by weight of 6-ethoxy-pseudo-tropine-phenyl-cyclohexyl-acetic acid ester in 5 parts by volume of methyl bromide and 3 parts by volume of acetone is allowed to stand in a bomb tube at room temperature (about 20–30°) for 24 hours. The precipitated crystals are filtered off. The so-obtained 6-ethoxy-pseudo-tropine-phenyl-cyclohexyl-acetic acid ester bromomethylate, crystallized out of acetone, melts at 213–214° (with decomposition).

The 6 - ethoxy - pseudo - phenyl - cyclohexyl-acetic acid ester, used as starting material in the present example, may be prepared after the manner described in the last paragraph of Example 4, using the 6-ethoxy-tropine in lieu of the 6-methoxy-tropine.

Example 15

The solution of 1 part by weight of 6-ethoxy-pseudo-tropine-α-phenyl-α-cyclohexyl-glycolic acid ester in 5 parts by volume of methyl bromide and 3 parts by volume of acetone is allowed to stand in a bomb tube at room temperature (about 20–30°) for 24 hours. The mixture is then concentrated under reduced pressure, the residue is taken up in a small quantity of acetone, and the so-formed 6 - ethoxy - pseudo-tropine-α-phenyl-α-cyclohexyl-glycolic acid ester bromomethylate is caused to crystallize out by the careful addition of ether. The so-obtained bromomethylate crystallizes out of acetone-ether in the form of needles which melt at 215–217° (with decomposition).

The 6 - ethoxy - pseudo-tropine-α-phenyl-α-cyclohexyl-glycolic acid ester, used as a starting material in the present example, may be prepared after the manner set forth in the last paragraph of Example 5, using the 6-ethoxy-pseudo-tropine in lieu of the 6-methoxy-pseudo-tropine.

Example 16

The solution of 1.2 parts by weight of 6-ethoxy-pseudo-tropine-xanthene-9-carboxylic acid ester in 10 parts by volume of methyl bromide and 3 parts by volume of ethanol is heated to 70° in a bomb tube for 2 hours. The mixture is then concentrated in vacuo, the residue is taken up in a small quantity of methanol, and the formed 6-ethoxy-pseudo-tropine-xanthene - 9 - carboxylic acid ester bromomethylate is caused to crystallize out by the careful addition of ether. The so-obtained bromomethylate crystallizes out of ethanol-ether in the form of needle clusters which melt at 224–226° (with decomposition).

The 6 - ethoxy - pseudo - tropine-xanthene-9-carboxylic acid ester, used as starting material in the present example, may be prepared after the manner set forth in the last paragraph of Example 7, replacing the 6-methoxy-pesudo-tropine by 6-ethoxy-pseudo-tropine.

Example 17

The solution of 1 part by weight of 6-ethoxy-pseudo-tropine-p-butoxy-benzoic acid ester in 5 parts by volume of methyl bromide and 3 parts by volume of acetone is allowed to stand in a closed container at room temperature (about 20–30°) for 48 hours. The mixture is then concentrated in vacuo, the residue is taken up in a small quantity of acetone, and the formed 6-ethoxy-pseudo-tropine-p-butoxy-benzoic acid ester bromomethylate is caused to crystallize out by the careful addition of ether. The so-obtained bromomethylate crystallizes out of acetone-ether in the form of platelets which melt at 194–196° (with decomposition).

The 6 - ethoxy - pseudo - tropine-p-butoxy-benzoic acid ester, used as starting material in the present example, may be prepared after the manner set forth in the last paragraph of Example 9, using the 6-ethoxy-pseudo-tropine in lieu of the 6-methoxy-pseudo-tropine.

Example 18

The solution of 1 part by weight of N-butyl-6-methoxy-nortropine-veratric acid ester in 5 parts by volume of methyl bromide and 3 parts by volume of methanol is heated to 60–70° in a bomb tube for 3 hours. After cooling, the precipitated crystal mass is filtered off and recrystallized from methanol. The so-obtained N-butyl-6-methoxy-nortropine-veratric acid ester bromomethylate crystallizes out of methanol in the form of lamellae which melt at 222° (with decomposition).

The N-butyl-6-methoxy-nortropine-veratric acid ester, used as starting material in the present example, may be prepared as follows:

A mixture of 4 parts by weight of N-butyl-6-methoxy-nortropine and 7.8 parts of veratric acid-ethyl-ester is heated with a small quantity of metallic sodium in vacuo for 30 hours. The reaction mixture is taken up in hydrochloric acid and then extracted with ether. The N-butyl-6-methoxy-nortropine-veratric acid ester hydrochloride is extracted directly from the aqueous hydrochloric acid solution with the aid of chloroform. The desired starting material is obtained from this hydrochloride.

Example 19

The solution of 1 part by weight of N-benzyl-6-methoxy-nortropine-benzilic acid ester in 5 parts by volume of methyl bromide and 3 parts by volume of methanol is heated to 60–70° in a bomb tube for 3 hours. The mixture is concentrated in vacuo, the residue is taken up in a small quantity of methanol, and the formed N-benzyl-6-methoxy-nortropine-benzilic acid ester bromomethylate is caused to crystallize out by the careful addition of ether. The so-obtained bromomethylate crystallizes out of methanol-ether in the form of crystals which melt at 247–250° (with decomposition).

The N - benzyl - 6 - methoxy - nortropine-benzilic acid ester, used as starting material in the present example, may be prepared as follows:

A mixture of 12 parts by weight of N-benzyl-6-methoxy-nortropine and 24.8 parts by weight of benzilic acid-ethylester is heated with a small quantity of metallic sodium at 120–130° in vacuo for 30 hours. The reaction mixture is taken up in hydrochloric acid, and is then extracted with ether. The aqueous hydrochloric acid layer is shaken out with chloroform, and the chloroform extract is then evaporated. N-benzyl-6-methoxy-nortropine-benzilic acid ester hydrochloride crystallizes out of a solution of the residue in methanol, upon the addition of ether. The desired starting compound is obtained from this hydrochloride.

Example 20

(a) The solution of 1.5 parts by weight of 6-methoxy-tropine-benzilic acid ester in 15 parts by volume of methyl bromide is heated to about 60° in a bomb tube for 1 to 3 hours. The reaction starts at ambient temperature, even before the heating is begun. The reaction product, a solid crystal mass, is triturated with ether and is filtered off. The so-obtained 6-methoxy-tropine-benzilic acid ester bromomethylate melts at 234–235° (with decomposition), after recrystallization from methanol-ether.

(b) 3 parts by volume of methyl bromide are added to the solution of 0.5 part by weight of 6-methoxy-tropine-benzilic acid ester in 25 parts by volume of methanol, and the mixture is allowed to stand in a well-sealed container for 24 hours in the cold. After evaporating off excess methyl bromide and concentrating down to 3 parts by volume, the formed 6-methoxy-tropine-benzilic acid ester bromomethylate is caused to crystallize out by the careful addition of ether. The so-obtained bromomethylate, after recrystallization from methanol-ether, melts at 234–237° (with decomposition).

(c) The solution of 0.5 part by weight of 6-methoxy-tropine-benzilic acid ester in 5 parts by volume of absolute methanol and 3 parts by volume of methyl bromide is allowed to stand in a bomb tube at room temperature (about 20–30°) for 48 hours. The clear solution is then concentrated down to about 3 parts by volume, and the formed 6-methoxy-tropine-benzilic acid ester bromomethylate is caused to crystallize out by the careful addition of ether. The so-obtained bromomethylate melts at 239–241° (with decomposition). The mixed melting point of the products prepared according to the three variations described in the present example shows no depression.

The 6-methoxy-tropine-benzilic acid ester, used as starting material in the present example, can be prepared as follows:

A mixture of 7.29 parts by weight of 6-methoxy-tropine and 21.9 parts by weight of benzilic acid-ethylester is heated with a small quantity of sodium to 125–130° in vacuo for 30 hours. The reaction mixture is taken up in hydrochloric acid, and is then extracted with ether. The aqueous hydrochloric acid layer is made alkaline with ammonium hydroxide, whereupon 6-methoxy-tropine-benzilic acid ester is precipitated and may be isolated.

*Example 21*

(a) The solution of 1.5 parts by weight of 6-methoxy-tropine-benzoic acid ester in 10 parts by volume of methyl bromide is heated to about 60° in a bomb tube for 1 to 3 hours. The reaction commences even at ambient temperature. The reaction product is washed with ether and is recrystallized from methanol-ether. The so-obtained 6 - methoxy - tropine - benzoic acid ester bromomethylate melts at 271–274° (with decomposition).

(b) 6 parts by volume of methyl bromide are added to the solution of 1.0 part by weight of 6-methoxy-tropine-benzoic acid ester in 25 parts by volume of absolute methanol, and the mixture is allowed to stand for 24 hours in a well-sealed container in the cold. After evaporating off excess methyl bromide and methanol, the residue is caused to crystallize by the incorporation thereinto of a small quantity of ether. The so-obtained 6-methoxy-tropine-benzoic acid ester bromomethylate melts at 272–274° (with decomposition).

(c) The solution of 1.0 part by weight of 6-methoxy-tropine-benzoic acid ester in 25 parts by volume of absolute methanol is boiled under reflux together with 10 parts by volume of methyl iodide for 3 hours, and the produced 6-methoxy-tropine-benzoic acid ester iodomethylate is precipitated by the addition of ether, is filtered off, and is shaken for 12 hours in 25 parts by volume of absolute methanol together with 2 parts by weight of silver bromide. The silver salts are removed by filtration and washed with methanol. The filtrate is boiled with a small quantity of animal charcoal, filtered and concentrated, whereupon the 6-methoxy-tropine-benzoic acid ester bromomethylate is caused to crystallize out by the careful addition of ether. The so-obtained bromo-methylate melts at 272–274° (with decomposition).

The 6-methoxy-tropine-benzoic acid ester, used as starting material in the present example, may be prepared after the manner set forth in the last paragraph of Example 20, using 16.6 (instead of 7.29) parts by weight of 6-methoxy-tropine, and 29.1 parts by weight of benzoic acid-ethylester in lieu of 21.9 parts by weight of benzilic acid-ethylester.

*Example 22*

The mixture of 2 parts by weight of 6-methoxy-tropine-benzoic acid ester, 2 parts by volume of absolute methanol and 4 parts by volume of n-butyl bromide is heated to about 80–85° under reflux for 7 days. After cooling, the reaction mixture is triturated with ether, whereupon 6-methoxy-tropine-benzoic acid ester bromobutylate crystallizes out; recrystallized from methanol-ether, it melts at 227–228° (with decomposition).

*Example 23*

The solution of 1.5 parts by weight of 6-methoxy-tropine-veratric acid ester in 2 parts by volume of methanol and 10 parts by volume of methyl bromide is heated to about 60° in a bomb tube for two hours. Reaction sets in even at ambient temperature. The reaction product, a solid crystal mass, is triturated with ether and filtered off. The so-obtained 6-methoxy-tropine-veratic acid ester bromomethylate, recrystallized from methanol-ether, melts at 227–228° (with decomposition).

The 6-methoxy-tropine-veratic acid ester, used as starting material in the present example, can be prepared after the manner set forth in the last paragraph of Example 20, using 5.5 (instead of 7.29) parts by weight of 6-methoxy-tropine, and 13.5 parts by weight of veratic acid-ethylester in lieu of 21.9 parts by weight of benzilic acid-ethylester.

*Example 24*

2 parts by weight of 6-methoxy-tropine-veratic acid ester are dissolved in 2 parts by volume of absolute methanol, and then admixed with 4 parts by volume of n-butyl bromide and heated under reflux to 80°. Crystallization begins after 4 days, and is completed after 7 days. The crystal mass is triturated with ether and filtered off. The so-obtained 6-methoxy-tropine-veratic acid ester bromobutylate, recrystallized from methanol-ether, melts at 181–182° (with decomposition).

*Example 25*

1.5 parts by weight of 6-methoxy-tropine-mandelic acid ester (6-methoxy-homatropine) and 12 parts by volume of methyl bromide are heated to 60° in a bomb tube for 3 hours. Excess methyl bromide is thereupon evaporated off, and the residue crystallized out from methanol-ether. After repeated recrystallization from methanol-ether, the so-obtained 6-methoxy-tropine-mandelic acid ester bromomethylate melts at 216° (with decomposition).

The 6-methoxy-tropine-mandelic acid ester, used as starting material in the present example, can be prepared after the manner set forth in the last paragraph of Example 20, using 3.4 (instead of 7.29) parts by weight of 6-methoxy-tropine, and 7.2 parts by weight of mandelic acid-ethylester in lieu of 21.9 parts by weight of benzilic acid-ethylester.

*Example 26*

The solution of 1 parts by weight of 6-ethoxy-tropine-benzilic acid ester in 5 parts by volume of absolute ethanol and 5 parts by volume of methyl bromide is allowed to stand in a bomb tube at room temperature (about 20–30° for 48 hours. The clear solution is then concentrated down to 3 parts by volume, and the formed 6-ethoxy - tropine - benzilic acid ester bromomethylate is caused to crystallize out by the careful addition of ether. The so-obtained bromomethylate, recrystallized from ethanol-ether, melts at 224–225° (with decomposition).

The 6-ethoxy-tropine-benzilic acid ester can be prepared after the manner set forth in the last paragraph of Example 20, using 4.3 parts of 6-ethoxy-tropine instead of 7.29 parts by weight of 6-methoxy-tropine, and 11.95 (instead of 21.9) parts by weight of benzilic acid-ethylester.

Example 27

2 parts by weight of 6-ethoxy-tropine-benzilic acid ester are dissolved in 2 parts by volume of absolute methanol, and the mixture heated together with 4 parts by volume of n-butyl bromide to 80–85° under reflux for 7 days. After cooling, the reaction mixture is triturated with ether, whereupon 6-ethoxy-tropine-benzilic acid ester bromobutylate crystallizes out; recrystallized from ethanolester, it melts at 192–193° (with decomposition).

Example 28

The solution of 1.3 parts of 6-ethoxy-tropine- benzoic acid ester in 2 parts by volume of absolute methanol and 10 parts by volume of methyl bromide is heated to about 60° in a bomb tube for 3 hours. Reaction sets in even at ambient temperature. The reaction product, a solid crystal mass, is triturated with ether and filtered off. The so-obtained 6-ethoxy-tropine-benzoic acid ester bromomethylate, recrystallized from ethanol-ether, melts at 260–262° (with decomposition).

The 6-ethoxy-tropine-benzoic acid ester, used as starting material in the present example, may be prepared as follows:

A mixture of 4.26 parts by weight of 6-ethoxy-tropine and 6.9 parts by weight of benzoic acid-ethylester is heated with a small quantity of metallic sodium to 125–130° in vacuo for 30 hours. The reaction mixture is taken up in hydrochloric acid and then extracted with ether. Chloroform is added to the aqueous acid solution which, after cooling with ice, is rendered alkaline with aqueous sodium carbonate solution. Extraction is then carried out with chloroform, after which the latter is distilled off from the extract, leaving the desired 6-ethoxy-tropine benzoic acid ester as an oily residue.

Example 29

The solution of 2 parts by weight of N-butyl-6-methoxy-nortropine-benzilic acid ester in 3 parts by volume of methanol and 20 parts by volume of methyl bromide is heated to about 60° in a bomb tube for 3 hours. Reaction sets in even at ambient temperature. The reaction product, a solid crystal mass, is triturated with ether and filtered off. The so-obtained N-butyl-6-methoxy-nortropine-benzilic acid ester bromomethylate, recrystallized from methanol-acetone-ether, melts at 200–202° (with decomposition).

The N-butyl-6-methoxy-nortropine-benzilic acid ester can be prepared after the manner set forth in the last paragraph of Example 20, using 4.6 parts by weight of N-butyl-6-methoxy-nortropine instead of 7.29 parts by weight of 6-methoxy-tropine, and 11 (instead of 21.9) parts by weight of benzilic acid-ethylester.

Example 30

The solution of 1.4 parts by weight of N-butyl-6-methoxy-nortropine-benzoic acid ester in 2 parts by volume of absolute methanol and 12 parts by volume of methyl bromide is heated to about 60° in a bomb tube for 3 hours. The reaction begins even at ambient temperature. The reaction product, a solid crystal mass, is triturated with ether and filtered off. The so-obtained N-butyl-6-methoxy-nortropine-benzoic acid ester bromomethylate, after recrystallization from methanol-ether, melts at 218–220° (with decomposition).

The N-butyl-6-methoxy-nortropine-benzoic acid ester is prepared after the manner of the last paragraph of the preceding example, using 3.5 parts by weight of N-butyl-6-methoxy-nortropine and 4.9 parts by weight of benzoic acid-ethylester.

Example 31

The solution of 1.9 parts by weight of N-butyl-6-methoxy-nortropine-veratric acid ester in 3 parts by volume of absolute methanol and 20 parts by volume of methyl bromide is heated to about 60° in a bomb tube for 3 hours. Reaction begins even at ambient temperature. The reaction product, a solid crystal mass, is triturated with ether and filtered off. The so-obtained N-butyl-6-methoxy-nortropine-veratric acid ester bromomethylate melts at 222° (with decomposition), after recrystallization from methanol.

Example 32

The solution of 2.7 parts by weight of N-butyl-6-ethoxy-nortropine-benzilic acid ester in 4 parts by volume of absolute ethanol and 20 parts by volume of methyl bromide is heated to about 60° in a bomb tube for 3 hours. Reaction starts even at ambient temperature. The reaction product, a solid crystal mass, is triturated with ether and is filtered off. The so-obtained N-butyl-6-ethoxy-nortropine-benzilic acid ester bromomethylate, after recrystallization from ethanol-ether, melts at 211–212° (with decomposition).

The N-butyl-6-ethoxy-nortropine-benzilic acid ester is prepared after the manner set forth in the last paragraph of Example 20, using the corresponding quantities of N-butyl-6-ethoxy-nortropine and benzilic acid-ethylester.

Example 33

The solution of 1.8 parts of N-butyl-6-ethoxy-nortropine-benzoic acid ester in 3 parts by volume of absolute ethanol and 15 parts by volume of methyl bromide is heated to about 60° in a bomb tube for 3 hours. The reaction begins even at ambient temperature. The reaction product, a solid crystal mass, is triturated with ether and filtered off. The so-obtained N-butyl-6-ethoxy-nortropine-benzoic acid ester bromomethylate melts, after recrystallization from ethanol-ether, at 187–188° (with decomposition).

The N-butyl-6-ethoxy-nortropine-benzoic acid ester is prepared as follows:

A mixture of 5 parts by weight of N-butyl-6-ethoxy-nortropine and 6.6 parts by weight of benzoic acid-ethylester is heated with a small quantity of metallic sodium to 125–130° in vacuo for 30 hours. The reaction mixture is taken up in hydrochloric acid and extracted with ether. Chloroform is added to the aqueous acid solution, which is then cooled and rendered alkaline with ammonium hydroxide, after which extraction with chloroform is carried out. After evaporation of the extracting agent from the extract, the N-butyl-6-ethoxy-nortropine-benzoic acid ester is obtained as an oily residue.

Example 34

The mixture of 2.5 parts by weight of 6-methoxy-tropine-benzilic acid ester, 2.5 parts by volume of absolute methanol and 5 parts by volume of n-butyl bromide is heated to 70° under reflux for 8 days. After cooling, the reaction mixture is triturated with ether, whereupon 6-methoxy-tropine-benzilic acid ester bromobutylate crystallizes out. Recrystallized from methanol-ether, the bromobutylate melts at 176–178° (with decomposition).

Example 35

The solution of 2 parts by weight of 6-isopropoxy-tropine-benzilic acid ester in 20 parts by volume of methyl bromide is heated to 60–70° in a bomb tube for 3 hours. The reaction product, a solid crystal mass, is triturated with ether and filtered off. The so-obtained 6-isopropoxy-tropine-benzilic acid ester bromomethylate melts, after recrystallization from methanol-ether, at 204–208° (with decomposition).

The 6-isopropoxy-tropine-benzilic acid can be prepared after the manner set forth in the last paragraph of Example 33, using a mixture of 2.6 parts by weight of 6-isopropoxy-tropine and 6.7 parts by weight of benzilic acid-ethylester.

Example 36

The solution of 1 part by weight of 6-ethoxy-pseudotropine-benzilic acid ester in 2 parts by volume of absolute ethanol and 10 parts by volume of methyl bromide is heated to 60–70° in a bomb tube for 3 hours. The reaction product, a solid crystal mass, is triturated with ether and filtered off. The so-obtained 6-ethoxy-pseudo-tropine-benzilic acid ester bromomethylate is recrystallized from methanol-ether; M. P. 245–247° (with decomposition).

The 6-ethoxy-pseudo-tropine-benzilic acid ester can be prepared by heating a mixture of 5.1 parts by weight of 6-ethoxy-pseudo-tropine and 14.1 parts by weight of benzilic acid-ethylester together with a small quantity of sodium to 110–115° under reduced pressure for 30 hours. The reaction mixture is taken up in hydrochloric acid, and is then extracted with ether. The aqueous hydrochloric acid layer is shaken out with chloroform, and the chloroform extract is then evaporated. 6-ethoxy-pseudo-tropine-benzilic acid ester hydrochloride is caused to crystallize out from a solution of the said residue in ethanol. The desired starting compound for the present example is obtained from this hydrochloride.

*Example 37*

The solution of 1 part by weight of 6-methoxy-pseudo-tropine-benzoic acid ester in 1 part by volume of absolute methanol and 5 parts by volume of methyl bromide is heated to 60–70° in a bomb tube for 3 hours. The reaction product, a solid crystal mass, is triturated with ether and filtered off. The so-obtained 6-methoxy-pseudo-tropine-benzoic acid ester bromomethylate melts, after being recrystallized from methanol-ether, at 252–253° (with decomposition).

The starting 6-methoxy-pseudo-tropine-benzoic acid ester can be prepared after the manner set forth in the last paragraph of Example 36, using a mixture of corresponding quantities of 6-methoxy-pseudo-tropine and benzoic acid-ethylester.

*Example 38*

The solution of 1.3 parts by weight of 6-methoxy-pseudo-tropine-veratric acid ester in 1 part by volume of absolute methanol and 15 parts by volume of methyl bromide is heated to 60–70° in a bomb tube for 3 hours. The reaction product, a solid crystal mass, is triturated with ether and filtered off. The so-obtained 6-methoxy-pseudo-tropine veratric acid ester bromomethylate melts at 208–209° (with decomposition), after being recrystallized from methanol-ether.

The starting 6-methoxy-pseudo-tropine-veratric acid ester can be prepared after the manner set forth in the last paragraph of Example 36, using a mixture of corresponding quantities of 6-methoxy-pseudo-tropine and veratric acid ethylester.

In the foregoing examples, the particular alkyl halide employed may, with like success and without otherwise deviating from the procedure, be replaced by other alkyl halides. Thus, methyl bromide may be replaced by any one of e. g. the following: ethyl bromide, ethyl chloride, ethyl iodide, methyl chloride, methyl iodide, butyl chloride, butyl iodide, whereupon the corresponding haloalkylate will result.

Having thus disclosed the invention what is claimed is:

1. A compound which corresponds to the formula

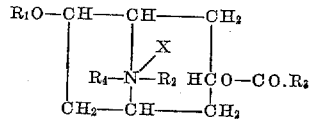

wherein $R_1$ stands for lower alkyl, $R_2$ stands for a monovalent hydrocarbon radical containing at most 7 carbon atoms and $R_3$ is a member selected from the group consisting of

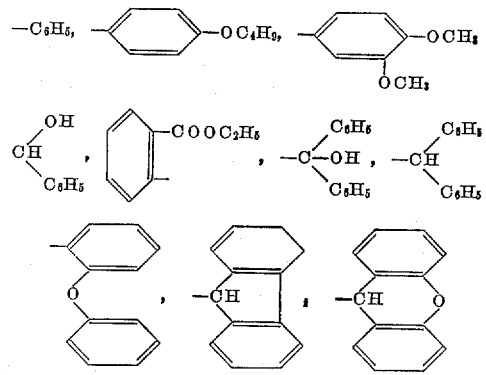

$R_4$ is lower alkyl, and X stands for a member selected from the group consisting of Cl, Br and I.

2. 6-methoxytropine-benzilic acid ester bromomethylate.

3. 6-methoxy-pseudo-tropine-benzilic acid ester bromomethylate.

4. 6-ethoxy-pseudo-tropine-benzilic acid ester bromomethylate.

5. 6-methoxy-pseudo-tropine-xanthene-9-carboxylic acid ester bromomethylate.

6. 6-ethoxy-pseudo-tropine-xanthene-9-carboxylic acid ester bromomethylate.

References Cited in the file of this patent

Rothlin et al.: Experientia, vol. 10, pp. 142–5 (1954).

UNITED STATES PATENT OFFICE
CERTIFICATE OF CORRECTION

Patent No. 2,800,477

Arthur Stoll et al.

July 23, 1957

It is hereby certified that error appears in the printed specification of the above numbered patent requiring correction and that the said Letters Patent should read as corrected below.

Column 7, line 70, for "-pesudo-" read -- -pseudo- --; column 10, lines 32 and 38, for "-veratic" read -- -veratric --; in each occurrence; column 11, lines 9 and 10, for "ethanolester" read -- ethanol-ether --; column 14, between lines 25 and 29, right-hand portion of the formula, for

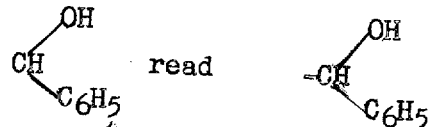

Signed and sealed this 15th day of October 1957.

(SEAL)

Attest:

KARL H. AXLINE
Attesting Officer

ROBERT C. WATSON
Commissioner of Patents